United States Patent [19]

Hoffer et al.

[11] 4,258,024
[45] Mar. 24, 1981

[54] NON-POLLUTANT PROCESS FOR THE MANUFACTURE OF NEUTRAL CALCIUM HYPOCHLORITE WITH A HIGH CONTENT OF ACTIVE CHLORINE

[75] Inventors: Jean O. Hoffer, Thann; Jean C. Guelen, Fellering; Pierre J. Portes, Thann; Jean P. Haller, Kruth, all of France

[73] Assignee: Potasse et Produits Chimiques, Thann, France

[21] Appl. No.: 124,854

[22] Filed: Feb. 26, 1980

Related U.S. Application Data

[63] Continuation-in-part of Ser. No. 858,355, Dec. 7, 1977, abandoned, which is a continuation of Ser. No. 770,845, Feb. 22, 1977, abandoned, which is a continuation of Ser. No. 668,670, Mar. 19, 1976, abandoned.

[30] Foreign Application Priority Data

Mar. 27, 1975 [FR] France ............................. 75 10687
Sep. 19, 1975 [FR] France ............................. 75 29461

[51] Int. Cl.$^3$ ............................................. C01B 11/06
[52] U.S. Cl. ..................................................... 423/474
[58] Field of Search ............... 423/473, 474; 209/164, 209/162

[56] References Cited

U.S. PATENT DOCUMENTS

| 1,718,284 | 6/1929 | George ................................. 423/474 |
| 2,320,635 | 6/1943 | Mericola ............................. 423/474 |
| 2,368,042 | 1/1945 | Robson ................................. 423/474 |
| 2,441,337 | 5/1948 | Sprauer ................................ 423/474 |
| 2,587,071 | 2/1952 | Sprauer ................................ 423/474 |
| 3,767,775 | 10/1973 | Tatara ................................. 423/474 |
| 3,950,499 | 4/1976 | Miyashin ............................. 423/474 |

FOREIGN PATENT DOCUMENTS 2612440 10/1976 Fed. Rep. of Germany ........... 423/474
1301461 12/1972 United Kingdom .................... 209/166

OTHER PUBLICATIONS

Taggart, *Elements of Ore Dressing*, John Wiley & Sons Inc., New York, 1951, pp. 324–327.

*Primary Examiner*—Brian E. Hearn
*Attorney, Agent, or Firm*—Stevens, Davis, Miller & Mosher

[57] ABSTRACT

A process for the manufacture of neutral calcium hypochlorite wherein (a) a dibasic calcium hypochlorite is manufactured by adding lime to the recycled mother liquor obtained in at least one of steps (b), (c), (d) and (e), (b) the dibasic substance is separated from its mother liquor, (c) the separated dibasic substance and added caustic soda are chlorinated simultaneously, in a suspension of preformed crystals of neutral calcium hypochlorite and sodium chloride, (d) the crystalline calcium hypochlorite is separated from the crystalline sodium chloride and (e) the resulting neutral calcium hypochlorite is treated and dried in a conventional manner, and, the resulting sodium chloride is crystallized and purified by washing with the mother liquor from step (b). A neutral calcium hypochlorite is produced having a high content of active chlorine and with substantial reduction of environmental pollution by discharge of effluent.

7 Claims, 4 Drawing Figures

NON-POLLUTANT PROCESS FOR THE MANUFACTURE OF NEUTRAL CALCIUM HYPOCHLORITE WITH A HIGH CONTENT OF ACTIVE CHLORINE

This application is a continuation-in-part of Ser. No. 858355 filed Dec. 7, 1977 now abandoned, which is itself a continuation of Ser. No. 770845 filed Feb. 22, 1977 and now abandoned which is itself a continuation of Ser. No. 668670 filed Mar. 19, 1976 and now abandoned.

The present invention relates to a process for the manufacture of neutral calcium hypochlorite with a high content of active chlorine, which involves the recycling of all the mother liquors with complete recovery of the solid constituents and so substantially eliminating environmental pollution by discharge of effluent.

Many processes for the manufacture of calcium hypochlorite, have been recently proposed but they all have important points in common: they use the same starting materials such as lime, caustic soda and chlorine, and sometimes certain derivatives of these materials such as sodium hypochlorite, calcium chloride or, more rarely, caustic potash, lithium hydroxide or the like. Most of the processes are designed to reduce to the maximum extent or to eliminate waste materials due to the mother liquors containing essentially inert substances, chlorides, hypochlorites or chlorates, silicates and carbonates. Certain processes recommend the use of pure starting materials or apply a process for the purification of the latter, mainly in the case of lime.

In general, the process of chlorination by introducing chlorine into the alkalis is carried out in the form of two variants which are:

(a) processes effecting the simultaneous chlorination of the two alkalis: these are processes involving one production line. The overall reaction is well known and proceeds as follows:

Amongst the disadvantages of these techniques, it will be noted that it is necessary to evaporate large amounts of water in vacuo, and this increases the danger of decomposition, see for example U.S. Pat. No. 3,251,647 (Olin Corporation).

(b) Processes based on the separate chlorination of the two alkalis: they involve manufacture on two production lines where operations illustrated symbolically by the following equations are carried out:

The disadvantages of these processes are both of an economic and technical nature and include the need to install two chlorination lines, production of concentrated sodium hypochlorite in vacuum evaporators leading to a loss of active chlorine, difficulty in isolating the sodium chloride present in the concentrated viscous suspension of sodium hypochlorite, and evaporation of water.

These recommended processes can also cause secondary side reactions which reduce the yields; for example, decomposition of hypochlorite during the chlorination and concentration processes leading to the formation of calcium chlorate and calcium chloride and consequently to a loss of chlorine: see for example French Pat. No. 2,114,896 (Nippon Soda) and French Pat. No. 2,186,425 (Olin Corporation).

The Nippon Soda French Pat. No. 2,114,896 (corresponding to the Tatara U.S. Pat. No. 3,767,775) establishes that, prior to the present invention, those skilled in the art were well aware of the particle size distribution, and hence the effect thereof on separability, of relatively small size neutral calcium hypochlorite crystals and relatively large size sodium chloride crystals, in calcium hypochlorite manufacture.

The present invention does not possess these disadvantages: it relates to a process for the manufacture of neutral calcium hypochlorite with a high content of active chlorine, in a single production line, with isolation of sodium chloride in the pure and crystalline state, with complete recycling of the mother liquors, without any pollutant waste materials, without evaporation and without addition of water for the washing processes. The present invention also possesses indisputable advantages amongst which there may be mentioned the low amount of investment resulting from the principle of simultaneous chlorination, the easy separation and recovery of sodium chloride, the economy with regard to starting matertials and energy, and the improvement in the quality of the hypochlorite.

The present invention provides a process for the manufacture of neutral calcium hypochlorite wherein (a) a dibasic calcium hypochlorite is manufactured by adding lime to the recycled mother liquor obtained in at least one of steps (b), (c), (d) and (e), (b) the dibasic substance is separated from its mother liquors, (c) the separated dibasic substance and added caustic soda are chlorinated simultaneously, in a suspension of preformed crystals of neutral calcium hypochlorite and sodium chloride, (d) the crystalline calcium hypochlorite is separated from the crystalline sodium chloride, and (e) the resulting neutral calcium hypochlorite is treated and dried in a conventional manner, and, the resulting sodium chloride is crystallised and purified by washing with the mother liquor from step (b).

More specifically the present invention provides a process for the manufacture of neutral calcium hypochlorite with high active chlorine content comprising the following steps:

a. a milk of lime is prepared by adding calcium hydroxide to a part of the recycled mother liquor originating from step (c)

b. the milk of lime is reacted with recycled mother liquor originating from step (g) or steps (g) and (h) or steps (f) and (h) to form a suspension of dibasic calcium hypochlorite c. the suspension of dibasic calcium hypochlorite is separated from a part of its mother liquor to form a thickened slurry of dibasic calcium hypochlorite and a mother liquor, part of which is recycled to step (a) and another part of which is recycled to step (h)

d. the thickened slurry of dibasic calcium hypochlorite and separately introduced sodium hydroxide are chlorinated together with gaseous chloride in the presence of a suspension of crystals of neutral calcium hypochlorite and crystals of sodium chloride pre-formed in the process, this suspension receiving recycled mother liquor originating from step (f) or step (g) or steps (f) and (g) or steps (g) and (h) whereby crystals of neutral calcium hypochlorite and crystals of sodium chloride are in suspension in a mother liquor e. the suspension of crystals produced in step (d) is formed into an upper suspension which is rich in crystals of neutral calcium hypochlorite and a lower suspension which is rich in crystals of sodium chloride and the lower and upper suspensions separated from one another f. the crystals of neutral calcium hypochlorite are separated from the suspension rich in calcium hypochlorite to leave a mother liquor which is recycled to step (e) or steps (b), (d) and (e) or steps (b) and (d)

g. optionally the crystals of sodium chloride are separated from the suspension rich in sodium chloride, in which case the resulting mother liquor is recycled to step (d) or steps (b) and (d)

h. the sodium chloride crystals from step (g) when used, or the lower suspension issuing from step (e) when step (g) is not used, is treated with at least a part of the mother liquor arising from step (c) and the crystals of sodium chloride separated from their mother liquor which is recycled entirely to step (b) or entirely to step (d), all the steps being carried out at a temperature not exceeding 20° C.

French Pat. No. 2114896 mentioned above, which corresponds to U.S. Pat. No. 3767775, claims a method of chlorination of a mixture of sodium hydroxide and calcium hydroxide under controlled conditions such that the reaction product comprises small size crystals of calcium hypochlorite and large size crystals of sodium chloride which can readily be separated from one another because of the size difference. The process of the present invention, while differing significantly from the process claimed in these French and U.S. Pat. Nos., also gives rise to a reaction product comprising small crystals of calcium hypochlorite and large crystals of sodium chloride which can be readily separated from one another because of their size difference. In practice, the present invention gives a reaction product in which most of the calcium hypochlorite crystals have a particle size in the region of 70 microns with very few crystals having a particle size in excess of 90 microns while most of the sodium chloride crystals have a particle size of at least 400 to 500 microns with very few crystals having a particle size less than 200 microns. It is well known that sodium chloride forms a cubic crystal so that significant particle size growth can occur during crystal formation while the calcium hypochlorite crystals grow as thin fragile plates so that much less growth occurs in individual crystals during crystal formation compared to the sodium chloride crystals. This particle size difference permits the separation of the two types of crystal from one another by simple physical means, e.g. flotation or decantation, as described in more detail below.

The process for the preparation of neutral calcium hypochlorite according to the invention can be continuous or partially discontinuous. It consists of preparing a dibasic calcium hypochlorite $Ca(ClO)_2 \cdot 2Ca(OH)_2$ by adding lime to the recycled mother liquors of the process; the decanted suspension of dibasic substance and caustic soda which is chlorinated simultaneously, are added to a suspension of crystals of neutral calcium hypochlorite and sodium chloride preformed in previous operations.

The crystals of neutral calcium hypochlorite are separated from the crystals of sodium chloride, for example, in one of the following ways;

by a flotation process; after separation of solids, the mother liquor from the hypochlorite is recycled to the flotation cell from which it came with the suspension of sodium chloride; the crystals of sodium chloride are extracted from this suspension and are subjected to systematic washing utilising the mother liquor from the dibasic substance from upstream in the process, by a decantation process using two decanters. The overflow from the first separator, rich in calcium hypochlorite, is dried and the resulting mother liquors recycled. The material retained in the first decanter, comprising principally sodium chloride is retained in the mother liquor, saturated with calcium hypochlorite and sodium chloride and is fed to the second decanter. The overflow from this, rich in hypochlorite, is dried. Sodium chloride is then extracted from the material retained in the second decanter, having reduced hypochlorite content and the sodium chloride is subjected to washing with the dibasic mother liquors arising upstream in the process, by a decantation process using only one decanter. The overflow from this decanter, containing principally calcium hypochlorite is dried and the resulting mother liquors are recycled to the chlorinater; the hypochlorite content of the material remaining in the decanter is reduced by washing with mother liquors saturated with sodium chloride and of reduced hypochlorite content.

The only materials to issue from the production line are the calcium hypochlorite which is suction-dried and then dried and crystalline sodium chloride.

Preferred embodiments of the invention involve applying flotation or decantation in order to separate the crystalline calcium hypochlorite from the crystalline sodium chloride. These operations are simple and elegant.

According to an embodiment of the invention, the flotation process is carried out in a cell containing the suspension of crystals, into which a gas is introduced through a diffuser which causes a foam to form, and this foam entrains the crystals of calcium hypochlorite to the upper portion. By separating the foam from the suspension, the crystals of hypochlorite are thus separated from the crystals of sodium chloride which have not floated. This operation is carried out in the following way:

(a) the introduction of finely divided gas into the flotation cell is carried out in the presence or absence of a flotation agent compatible with calcium hypochlorite and free chlorine, (b) the crystalline neutral calcium hypochlorite is entrained selectively by the flotation foam which contains a small amount of NaCl and this foam, issuing from the cell, is suction-dried directly, the isolated mother liquor returning to the cell, and (c) the majority of the sodium chloride, which remains in the part which has not floated, below the foam, retains only a very small amount of crystals of calcium hypochlorite and is suction-dried after having undergone systematic clarifying and washing processes using the mother liquor from the dibasic material originating from the first part of the cycle.

BRIEF DESCRIPTION OF THE DRAWINGS

Reference is now made to FIGS. 1-4 of the accompanying drawings which represent flow sheets illustrating the process.

According to a preferred process of carrying out the invention, the separation of the solid calcium hypochlorite and sodium chloride is affected by decantation. Two possible ways of carrying this out are described in the drawings. A first method, illustrated in FIG. 3, involves passing the suspension of crystals to be separated to a two-stage decantation; the second method, illustrated in FIG. 4, is carried out using a single decanter.

The advantages of carrying out the separation by decantation rather than flotation are both technical and economic. The apparatus is simpler, smaller, requires less capital expense and avoids the eventual recycling of organic compounds in the mother liquors. Moreover, the process described in FIG. 4 enables the drying of sodium chloride to be avoided before treatment with the dibasic mother liquors.

The process is simple and economical to carry out since it effects the separation operation in one step and does not involve recycling of solid material.

The quality of the sodium chloride isolated is such that it can be used in electrolysis.

In practice, a process according to the invention may comprise approximately 10 consecutive operations which can be followed easily on any one of FIGS. 1 to 4 of the accompanying drawings, it being possible for the process itself to be divided into 5 main parts A, B, C (or D), E and F with subdivisions corresponding to the operations indicated. The summary below makes it easier to follow the succession of operations and treatments. Concentrations are in % by weight. The ten consecutive operations ensure that, when a chlorination reactor is being brought into service for the first time, there is available a sufficient quantity of the suspension of crystals of neutral calcium hypochlorite and sodium chloride preformed in the process which is necessary for subsequent chlorination to produce a readily separable mixture of the two types of crystal. It will be recognised that in practice, there will always be available a sample of the suspension of crystals of neutral calcium hypochlorite and sodium chloride preformed in the process except in the rare case where a chlorinator is brought into service for the first time, e.g. after a total emptying and cleaning of a reactor. In this case, small quantities of crystals begin to build up in the chlorinator after each cycle of operation but these crystals are not immediately removed as a product stream but allowed to remain in the chlorinator. In this way, a body of crystals builds up in the chlorinator, increasing in size after each cycle of operation so that, by the time 10 consecutive cycles of operation have been carried out, a crystal suspension of sufficient magnitude has built up to permit removal of part of the suspension as a product stream and to leave the remainder of the suspension in the chlorinator to provide the necessary crystal suspension for subsequent cycles of operation.

During these consecutive cycles of chlorination, at the same time as the crystal mass develops in the chlorinator, two different types of crystal develop which enables:

(a) the necessary quantity of NaCl to be separated from the suspension, (b) the hypochlorite to be separated from its mother liquor.

A. FORMATION OF DIBASIC CALCIUM HYPOCHLORITE

1. Milk of lime
2. Precipitation of dibasic hypochlorite
3. Thickening of the suspension of dibasic hypochlorite

B. CHLORINATION

Conversion of the alkalis to crystalline neutral calcium hypochlorite and crystalline sodium chloride.

C. FLOTATION

Separation of crystals of sodium hypochlorite and sodium chloride by formation and separation of the foam which is rich in calcium hypochlorite from the remaining suspension which is rich in sodium chloride, or

D. DECANTATION

Separation of crystals of calcium hypochlorite and sodium chloride by preferential extraction of calcium hypochlorite in the overflow(s) of the decanter(s).

E. SEPARATION OF THE MOTHER LIQUOR

1. Separation from the neutral hypochlorite of the suspension of sodium chloride.
2. Purifying and washing of the sodium chloride by means of the mother liquor from the dibasic substance in order to solubilise crystals of calcium hypochlorite on the sodium chloride.
3. Suction-drying of the sodium chloride.

F. SUPPLEMENTARY TREATMENT

Suction-drying of calcium hypochlorite and finishing processes (granulation and drying).

In the remainder of the text, the general process for the manufacture of calcium hypochlorite according to the invention is described and is illustrated in FIGS. 1 to 4.

$A_1$ Milk of lime: mother liquor from the dibasic hypochlorite originating from the latter part of the process $A_3$ and lime in a powdery form of minimum concentration 97% are introduced into a cell. After stirring, a milk of lime containing 25% of $Ca(OH)_2$ is obtained.

$A_2$. This milk of lime continuously feeds the reactor $A_2$ which simultaneously receives mother liquor from the neutral substance originating from $E_1$ (FIG. 2) of the latter with the mother liquors resulting from the processes $E_1$, $E_2$ and $E_3$ (FIG. 1) or a mixture of $E_2$, $E_3$ and F (FIG. 3) or $E_3$ and F (FIG. 4) of purifying and washing the sodium chloride. The cell $A_2$ initially contained a certain quantity of crystals of dibasic hypochlorite originating from previous operations promoting good crystallisation of the dibasic substance formed. The cell operates on an overflow system and feeds the separation installation $A_3$.

$A_3$ This apparatus can be decanter of the static or dynamic type. The decanted mother liquor feeds the cell $A_1$ and the system for purifying the sodium chloride $E_2$. The decanted product, which contains essentially the dibasic substance, is conveyed to the chlorinator B.

B This chlorinator B, initially containing a sediment from previous operations, also receives caustic soda containing 59.5% NaOH and chlorine gas; at the same time, dilution is effected by recycling mother liquor coming from $E_1$ (FIG. 1) or $E_1$, $E_2$ and $E_3$ (FIG. 2) or $E_1$ and F (FIG. 3) or F (FIG. 4). The temperature must be below 20° C. The degree of free alkalinity is kept between 0.2 and 0.4%, expressed as $Ca(OH)_2$, for example by electrometric control. The suspension of neutral hypochlorite and sodium chloride is withdrawn to feed the flotation of decantation post.

C The flotation cell (or cells) possesses at its lower part a device for injecting and diffusing gas and optionally a device for metering out a flotation agent which is foaming and selective, of the type of a neutralised fatty alcohol sulphate, the alcohol being preferably lauryl alcohol, and the flotation agent being stable with respect to the hypochlorite.

Neutral calcium hypochlorite with a small amount of sodium chloride is to be found in the supernatant foaming part. After suction-drying, a cake is obtained which contains, for example, 52% of $Ca(ClO)_2$, 12% of NaCl and 32% of water. The mother liquor from this suction-drying process returns to the flotation cell. The phase which did not float, and which is rich in sodium chloride and contains a small amount of hypochlorite which did not float, is separated from its mother liquor at $E_1$ and is then subjected at $E_2$ to systematic clarification and washing processes with the mother liquor from the dibasic substance coming from $A_3$.

The sodium chloride, which generally contains 94% of NaCl and a maximum of 1% of $Ca(ClO)_2$, is suction-dried at $E_3$.

The actual decanting operation involves introducing the suspension issuing from the chlorinator into a decanter $D_1$ of small volume, equipped with a flow stirring device promoting flocculation of the sodium chloride. The overflow from $D_1$, which is rich in neutral calcium hypochlorite, is suction-dried in F. The underflow from $D_1$, which is rich in NaCl and contains a small amount of calcium hypochlorite, can be either diluted by addition of recycled mother liquor from the neutral substance in order to undergo a second decanting process in $D_2$ (FIG. 3) or mixed with mother liquor from the dibasic substance which is depleted in hypochlorite, with vigorous stirring, so as to feed the suction-filter $E_3$ (FIG. 4). In the first case, the overflow from $D_2$, which is rich in calcium hypochlorite, is recovered in F, the underflow from $D_2$, which is rich in sodium chloride, undergoing, after suction-drying, the washing and clarification processes proposed above.

In the second case, the mother liquor from the clarification process coming from $E_3$ is recycled to the first part of the process; the suction-dried sodium chloride does not contain more than 1 to 2% of calcium hypochlorite.

Compared with the known process, the process according to the invention possesses numerous technical advantages which result from the way in which the process is carried out. Thus, a great saving in starting materials is achieved by the mere fact of converting a dibasic calcium hypochlorite, prepared beforehand, directly into neutral calcium hypochlorite, without any chlorination reaction. Moreover, there is no direct introduction of milk of lime to the chlorination process and there is no addition of free lime to a mother liquor from the neutral substance, as in certain known processes. The other essential advantages are as follows:

(a) The isolation of the neutral calcium hypochlorite by means of a flotation cell or a decantation system simplifies the manufacturing process. In particular, it avoids: the use of the principle of two superposed fluidisation beds containing the two solids to be separated, namely sodium chloride and calcium hypochlorite, (this latter method always involves vacuum evaporation in order to condition the crystals); and the use of two production lines which are expensive to run, from one of which sodium chloride is obtained and from the other of which the hypochlorite is obtained.

(b) The ease with which limit is incorporated into the mother liquor from the dibasic substance.

(c) The washing of the sodium chloride, without supplying water, with a mother liquor which is depleted in hypochlorite and which dissolves only a small amount of sodium chloride.

(d) The side reactions are reduced to the maximum extent because the operations are carried out at a low temperature not exceeding 20° C.

(e) The crystallisation processes are effected by seeding, which leads to crystals which can be isolated readily from the mother liquors.

(f) The only water introduced originates from the 59% strength sodium hydroxide solution and is removed in the form of mother liquor retained in the hypochlorite cakes and in the sodium chloride.

(g) Unstable solutions or suspensions such as sodium hypochlorite are never present.

(h) There is no pollutant waste material.

The examples below will make it easier to understand the process of the invention and its value relative to the processes used previously. Four variants will be described in particular which, whilst leading to the same results, differ in the way in which the recycled mother liquors are distributed.

The quantities indicated correspond to the manufacture of 10 tonnes/day of dry neutral calcium hypochlorite with high content of active chlorine.

EXAMPLE 1

Figure 1:
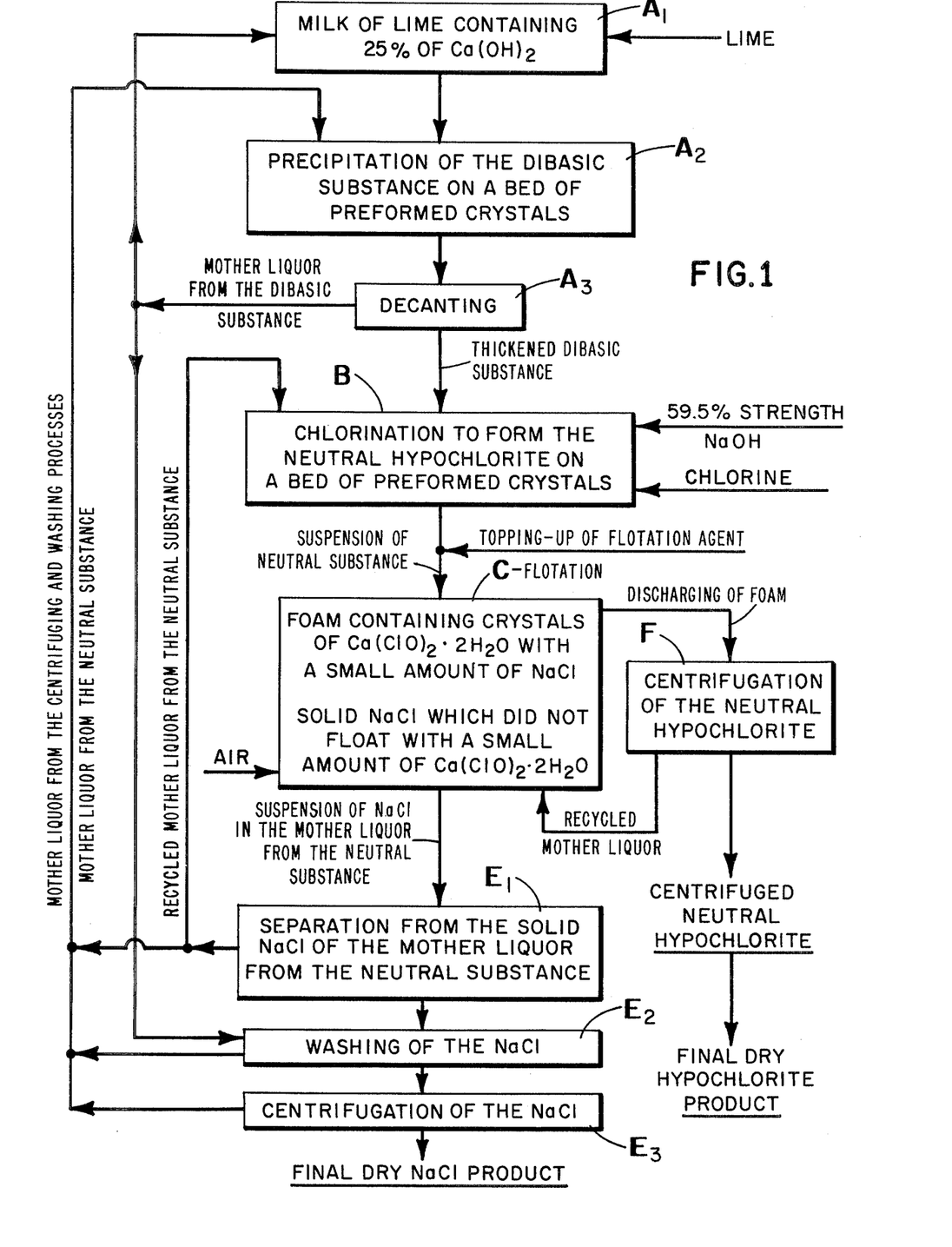

Reference can be made to FIG. 1. 4.45 tonnes of 97.1% lime are introduced into 12.5 tonnes of a mother liquor from the dibasic substance in order to obtain 17 tonnes of a 25% milk of lime ($A_1$). This milk of lime is reacted with 26.7 tonnes of mother liquor coming from $E_2$–$E_3$ and 46.7 tonnes of mother liquor from the neutral substance coming from $E_1$, which gives a suspension of approximately 90 tonnes of precipitated dibasic hypochlorite ($A_2$). The thickening of the suspension by natural sedimentation ($A_3$) leads, on the one hand, to 37.5 tonnes of clear mother liquor which is recycled to $A_1$ (12.5 tonnes) and to $E_2$ (25 tonnes) and, on the other hand, to 52.9 tonnes of a thickened suspension of dibasic substance containing approximately 8% of $Ca(OH)_2$.

This suspension is introduced into a chlorinator B at the same time as 7.4 tonnes of 59.5% strength caustic soda, 7.7 tonnes of chlorine and 25 tonnes of mother liquor from the neutral substance coming from $E_1$. Initially, the chlorinator contains a sediment, which acts as a seed bed, of approximately 93 tonnes of a suspension of crystals of neutral calcium hypochlorite and sodium chloride. The temperature of the reactor is kept below 20° C. by cooling. A free alkalinity corresponding to 0.2–0.4% of $Ca(OH)_2$ is maintained in the chlorinator B. The weight of solids formed in the chlorinator is approximately equal to that of the seed bed, that is to say approximately 93 tonnes. The average dwell time of the mass in the chlorination bed is between 2 and 6 hours.

The suspension then passes to the flotation cell C. 0.005% of a flotation agent, which is a surface-active agent essentially based on sodium lauryl-sulphate having adequate stability in a concentrated hypochlorite medium, is added to the suspension. Air is passed through a diffuser into the flotation cell. The combination of solids collected in the supernatant foam contains 90 to 95% of the solid hypochlorite and 28–30% of the solid sodium chloride which are initially present in the suspension. The suspension of sodium chloride containing a small amount of solid hypochlorite remains under the layer of foam.

The solids collected by the foam are suction-dried at F. This suction-drying process gives, on the one hand, the cake of hypochlorite, and on the other hand, a mother liquor which returns to the flotation cell C.

The suspension of sodium chloride which issues from the flotation process and which is depleted in $Ca(ClO)_2 \cdot 3H_2O$ is approximately 78 tonnes. It is separated from its mother liquor in $E_1$ and then clarified and washed in $E_2$ with 25 tonnes of mother liquor from the dibasic substance coming from $A_3$. The cake is then suction-dried in $E_3$, which leads to 4.8 tonnes of sodium chloride.

Furthermore, the cake of 14.7 tonnes of calcium hypochlorite issuing from F is treated and dried in accordance with known techniques.

The analyses of the mother liquors, the suspensions and the solids are given in Table No. 1.

TABLE 1

| (1)Mother liquors | 1 | 2 | 3 | | | |
|---|---|---|---|---|---|---|
| $Ca(ClO)_2$ | 9.70 | 3.755 | 5.605 | | | |
| $Ca(OH)_2$ | 0.029 | 0.06 | 0.071 | | | |
| $Ca(ClO_3)_2$ | 0.70 | 0.77 | 0.721 | | | |
| $CaCl_2$ | 0.49 | 0.52 | 0.483 | | | |
| NaCl | 19.86 | 22.11 | 23.252 | | | |
| $CaCO_3$ | 0.017 | 0.01 | 0.03 | | | |
| Other constituents | — | — | — | | | |
| $H_2O$ | 69.204 | 72.725 | 69.838 | | | |
| $d_{15}$ | 1.262 | 1.208 | 1.238 | | | |
| (2)Suspensions | 4 | 5 | 6 | 7 | 8 | 9 |
| $Ca(ClO)_2$ | 2.77 | 7.19 | 9.62 | 16.37 | 8.36 | 9.66 |
| $Ca(OH)_2$ | 25.47 | 4.82 | 8.20 | 0.263 | 0.24 | 0.07 |
| $Ca(ClO_3)_2$ | 0.55 | 0.70 | 0.65 | 0.58 | — | 0.62 |
| $CaCl_2$ | 0.37 | 0.47 | 0.44 | 0.40 | — | 0.43 |
| NaCl | 16.32 | 20.20 | 18.84 | 22.90 | 6.51 | 24.89 |
| $CaCO_3$ | 0.48 | 0.11 | 0.18 | 0.20 | 0.18 | 0.07 |
| Other constituents | 0.15 | 0.03 | 0.05 | 0.06 | 0.06 | 0.02 |
| $H_2O$ by difference | 53.89 | 66.48 | 62.02 | 59.23 | 17.46 | 64.24 |
| Mother liquor retained | 73.82 | 91.34 | 85.20 | 22.539 | 0 | 91.56 |
| $d_{15}$ | 1.372 | 1.274 | 1.321 | 1.37 | | |
| (3)Solids | 10 | 11 | 12 | 13 | 14 | |
| $Ca(ClO)_2$ | 52.10 | 43.41 | 9.20 | 1.00 | 73.18 | |
| $Ca(OH)_2$ | 1.30 | 55.10 | 0.5 | 0.60 | 3.10 | |
| $Ca(ClO_3)_2$ | 0.35 | — | 0.08 | 0.10 | 1.11 | |
| $CaCl_2$ | 0.25 | — | 0.07 | 0.10 | 1.95 | |
| NaCl | 12.28 | — | 79.40 | 93.80 | 18.35 | |
| $CaCO_3$ | 0.90 | 1.15 | 0.6 | 0.70 | 1.34 | |
| Other constituents | 0.30 | 0.34 | 0.2 | 0.27 | 0.45 | |
| $H_2O$ by difference | 32.52 | — | 9.95 | 3.43 | 0.52 | |
| Mother liquor retained | 29.07 | — | 11.42 | 3.1 | — | |

LEGEND FOR TABLES 1 AND 2
(1)Mother liquors
Column 1 : Mother liquor from the neutral substance
Column 2 : Mother liquor from the dibasic substance
Column 3 : Mother liquor from the clarification of the NaCl
(2)Suspensions
Column 4 : Milk of lime
Column 5 : Suspension of dibasic calcium hypochlorite prior to decanting
Column 6 : Thickened suspension of dibasic calcium hypochlorite
Column 7 : Suspension from the chlorinator
Column 8 : Actual solids in suspension in the chlorinator
Column 9 : Suspension of NaCl depleted in $Ca(ClO)_2 \cdot 3H_2O$ by the flotation process
(3)Solids
Column 10 : Suction-dried neutral hypochlorite
Column 11 : Dibasic hypochlorite without mother liquor
Column 12 : Sodium chloride prior to clarification
Column 13 : Sodium chloride after suction-drying
Column 14 : Dried neutral hypochlorite

EXAMPLE 2

Figure 2:
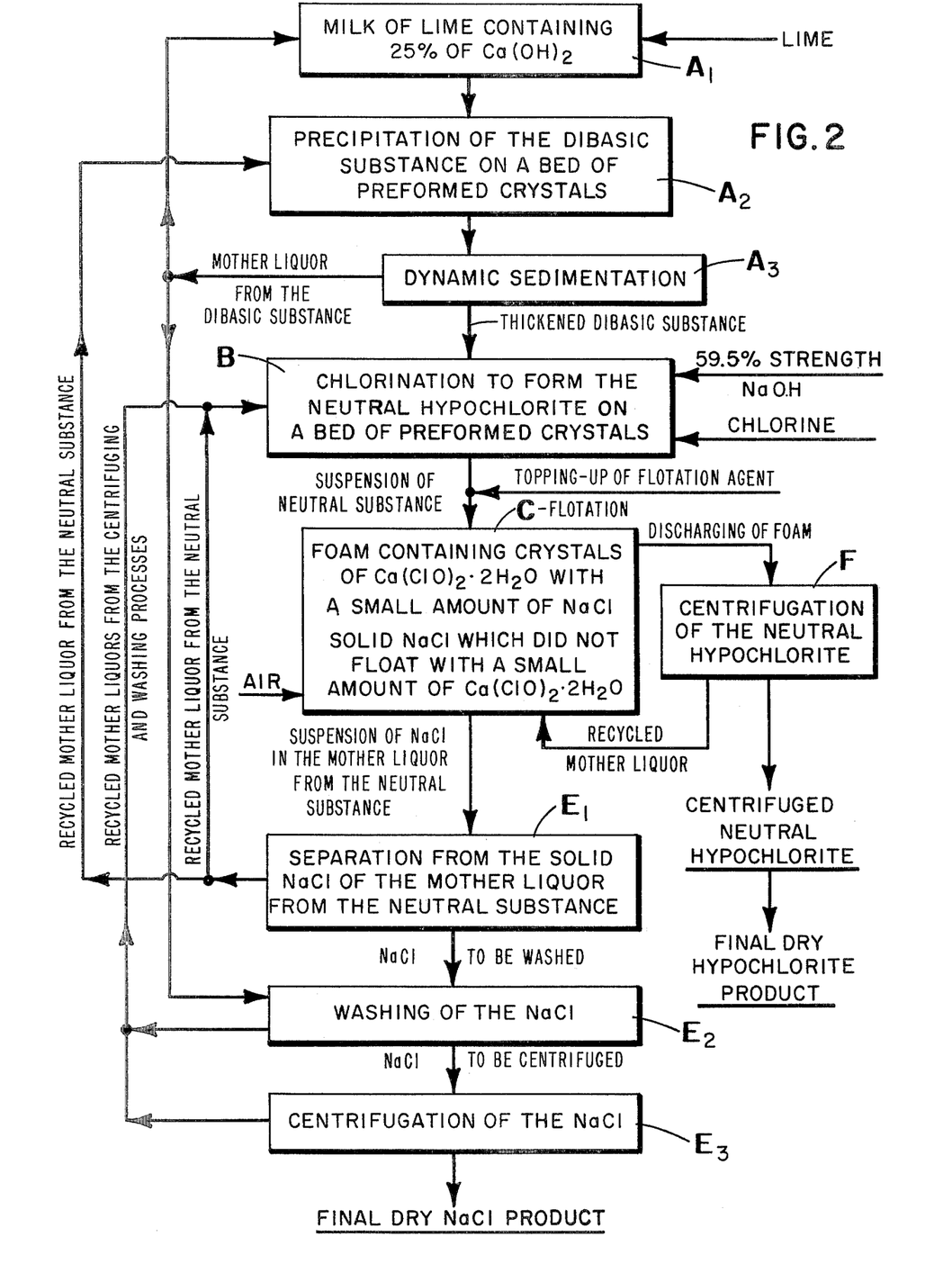

Reference can be made to FIG. 2 4.45 tonnes of lime containing 97% of $Ca(OH)_2$ are introduced into 13 tonnes of mother liquor from the dibasic material, in order to obtain 17.5 tonnes of milk of lime ($A_1$). This milk of lime is reacted with 56 tonnes of recycled mother liquor from the neutral substance originating from $E_1$, and this gives a suspension of dibasic substance of approximately 74 tonnes ($A_2$). Thickening of the suspension by dynamic sedimentation ($A_3$) leads, on the one hand, to 35.8 tonnes of thickened dibasic substance containing 12% of $Ca(OH)_2$, and on the other hand, to 37.7 tonnes of mother liquor from the dibasic substance.

This suspension of dibasic substance (35.8 tonnes) is introduced into a chlorinator B at the same time as: 7.4 tonnes of 59.5% strength NaOH, 7.7 tonnes of chlorine gas, 15.7 tonnes of mother liquor from the neutral substance coming from $E_1$ and 26.4 tonnes of mother liquor from the clarification and washing processes coming from $E_2$ and $E_3$.

The operations involving chlorination, flotation, suction-drying of the neutral hypochlorite, separation of the mother liquor from the solid NaCl, clarification, washing and suction-drying are identical to those of Example 1.

The essential advantage of this example resides in the fact that the volumes employed in $A_2$ and especially in $A_3$ are smaller than in Example 1; decanting is carried out in a dynamic decanter which makes it possible to recover the volume of mother liquor necessary for washing the NaCl, the proportion of lime in the dibasic decanted substance changing from 8 to 12% of $Ca(OH)_2$.

Table 2 gives the corresponding analyses.

TABLE 2

| (1)Mother liquors | 1 | 2 | 3 | | | |
|---|---|---|---|---|---|---|
| $Ca(ClO)_2$ | 9.70 | 3.77 | 5.64 | | | |
| $Ca(OH)_2$ | 0.029 | 0.07 | 0.08 | | | |
| $Ca(ClO_3)_2$ | 0.70 | 0.72 | 0.67 | | | |
| $CaCl_2$ | 0.49 | 0.53 | 0.49 | | | |
| NaCl | 19.86 | 21.14 | 22.36 | | | |
| $CaCO_3$ | 0.017 | 0.018 | 0.038 | | | |
| Other constituents | — | — | — | | | |
| $H_2O$ by difference | 69.204 | 73.752 | 70.714 | | | |
| $d_{15}$ | 1.262 | 1.204 | 1.231 | | | |
| (2)Suspensions | 4 | 5 | 6 | 7 | 8 | 9 |
| $Ca(ClO)_2$ | 2.808 | 8.06 | 12.58 | 16.37 | 8.36 | 9.66 |
| $Ca(OH)_2$ | 24.83 | 5.92 | 12.08 | 0.264 | 0.24 | 0.07 |
| $Ca(ClO_3)_2$ | 0.536 | 0.66 | 0.60 | 0.58 | — | 0.62 |
| $CaCl_2$ | 0.39 | 0.47 | 0.40 | 0.42 | — | 0.45 |
| NaCl | 15.75 | 18.88 | 16.51 | 22.92 | 6.51 | 24.91 |

TABLE 2-continued

| | | | | | | |
|---|---|---|---|---|---|---|
| CaCO$_3$ | 0.48 | 0.13 | 0.24 | 0.19 | 0.18 | 0.05 |
| Other constituents | 0.15 | 0.04 | 0.07 | 0.04 | 0.06 | |
| H$_2$O by difference | 55.056 | 65.84 | 57.52 | 59.22 | 17.46 | 64.22 |
| Mother liquor retained | 74.489 | 89.30 | 78.04 | 82.539 | 0 | 91.6 |
| d$_{15}$ | 1.350 | 1.282 | 1.376 | 1.37 | | |

| (3)Solids | 10 | 11 | 12 | 13 | 14 |
|---|---|---|---|---|---|
| Ca(ClO)$_2$ | 52.10 | 43.88 | 9.20 | 1.0 | 73.18 |
| Ca(OH)$_2$ | 1.30 | 54.75 | 0.5 | 0.6 | 3.10 |
| Ca(ClO$_3$)$_2$ | 0.35 | — | 0.08 | 0.1 | 1.11 |
| CaCl$_2$ | 0.25 | — | 0.07 | 0.1 | 1.95 |
| NaCl | 12.28 | — | 79.4 | 93.8 | 18.35 |
| CaCO$_3$ | 0.90 | 1.03 | 0.6 | 0.7 | 1.34 |
| Other constituents | 0.30 | 0.34 | 0.2 | 0.27 | 0.45 |
| H$_2$O by difference | 32.52 | — | 9.95 | 3.43 | 0.52 |
| Mother liquor retained | 29.07 | 0 | 11.42 | 3.1 | — |

EXAMPLE 3

Figure 3:
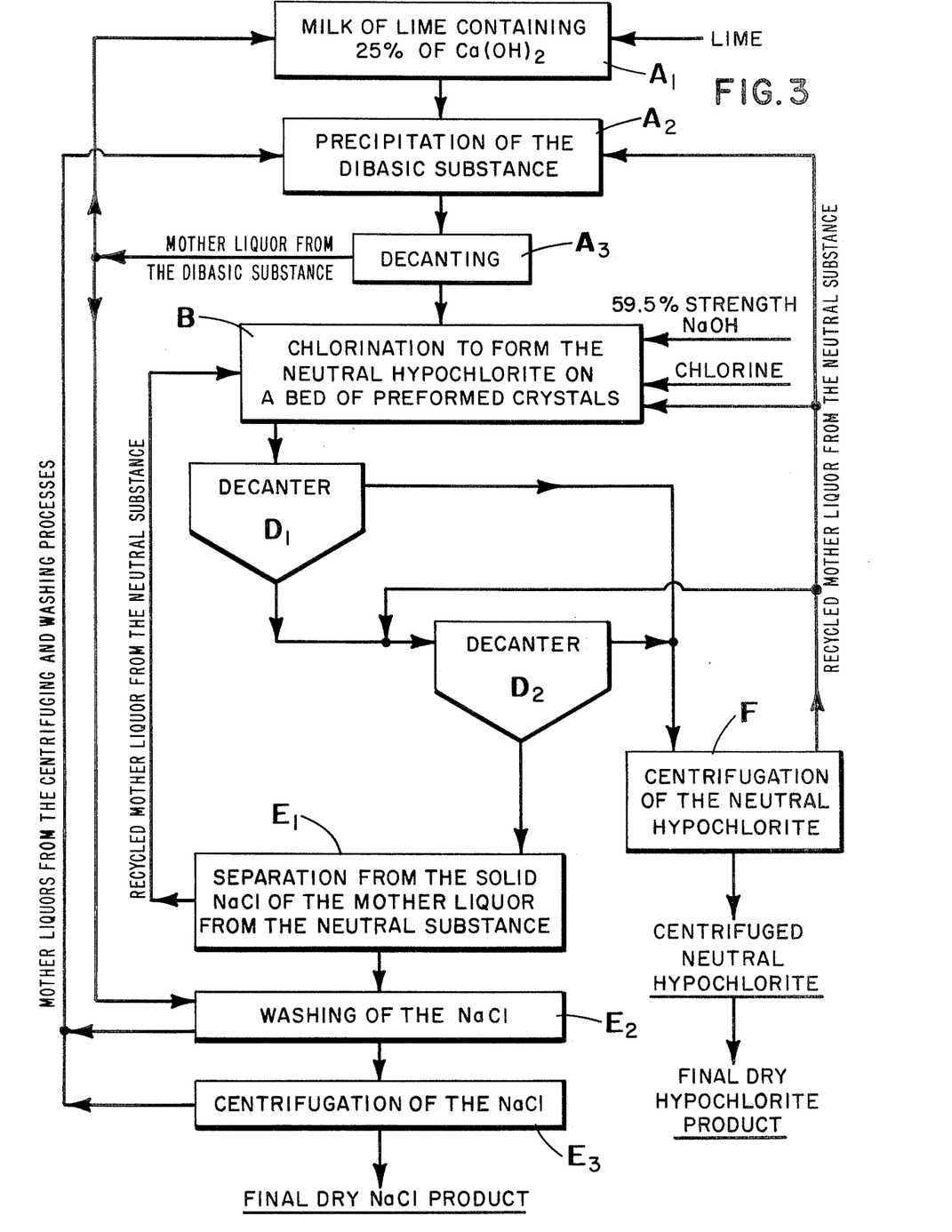
Figure 4:
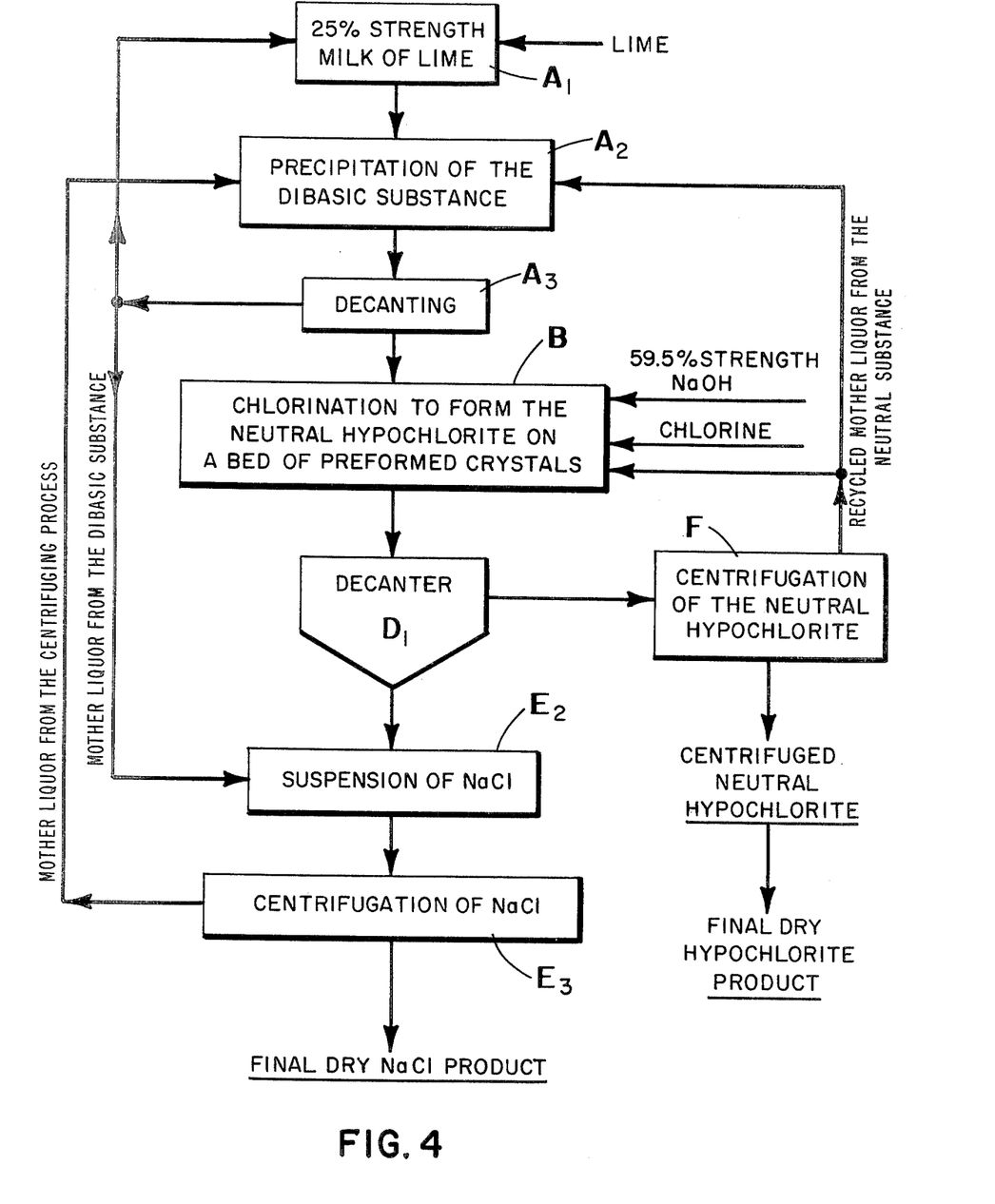

Reference is made to FIG. 3.

4.5 tonnes of lime containing 97.1% of Ca(OH)$_2$ are mixed, so as to form a suspension, with 12.5 tonnes of mother liquor from the dibasic substance, this mother liquor containing 3.75% of Ca(ClO)$_2$, 22.11% of NaCl and 72.78% of H$_2$O, so as to form 17 tonnes of milk of lime containing 25.47% of Ca(OH)$_2$ [A$_1$]. The milk of lime formed will react with 26.7 tonnes of mother liquor coming from E$_2$ and E$_3$, containing 5.61% of Ca(ClO)$_2$ and 23.25% of NaCl, and 46.7 tonnes of mother liquor from the neutral substance coming from F, containing 9.70% of Ca(ClO)$_2$ and 19.86% of NaCl. 90.4 tonnes of a suspension of dibasic hypochlorite containing 7.19% of Ca(ClO)$_2$, 4.82% of Ca(OH)$_2$ and 20.20% of NaCl are obtained in A$_2$.

The thickening of the suspension in A$_3$ leads, on the one hand, to 37.5 tonnes of mother liquor from the dibasic substance, this mother liquor being recycled to A$_1$ (12.5 tonnes) and E$_2$ (25 tonnes), and on the other hand, to 52.9 tonnes of thickened suspension of dibasic substance containing 8.2% of Ca(OH)$_2$, 9.62% of Ca(ClO)$_2$ and 18.84% of NaCl. This suspension feeds the chlorinator B. 7.3 tonnes of caustic soda containing 59.5% of NaOH, 7.7 tonnes of chlorine, 19.1 tonnes of mother liquor from the neutral substance coming from F and 6 tonnes of mother liquor from the neutral substance coming from E$_1$ are added simultaneously; 93 tonnes of suspension containing 16.37% of Ca(ClO)$_2$, 22.90% of NaCl and 59.23% of H$_2$O are thus obtained.

The chlorinator initially contains 93 tonnes of a suspension of crystals of calcium hypochlorite and sodium chloride acting as a seed bed. The chlorinated suspension continuously feeds the cylindrical decanter D$_1$ which has a slow stirring system. This decanter has a variable volume between 25 and 300 dm$^3$, a height from 6.4 to 14.7 dm, and a radius between 1.1 and 5.1 dm. In a decanter of this type, the dimensioning is a function of the degree of agitation. The underflow from D$_1$, namely 13.3 tonnes containing 10.18% of Ca(OH)$_2$ and 55.02% of NaCl, is taken up in 28.8 tonnes of mother liquor from the neutral substance so as to be introduced into the secondary decanter D$_2$. The combined overflows from D$_1$ and D$_2$, corresponding to 109.3 tonnes of the suspension containing 15.40% of Ca(ClO)$_2$ and 18.84% of NaCl, are suction-dried in F. 94.6 tonnes of mother liquor from the neutral substance and 14.7 tonnes of suction-dried neutral calcium hypochlorite containing 52.10% of Ca(ClO)$_2$ and 12.28% of NaCl are obtained.

The recovered mother liquor from the neutral substance is recycled to D$_2$ (28.8 tonnes), B (19.1 tonnes) and A$_2$ (46.7 tonnes). The underflow from D$_2$, corresponding to 12.5 tonnes containing 9.44% of Ca(ClO)$_2$ and 51.11% of NaCl, feeds the suction-filter E$_1$. 6.5 tonnes of suction-dried NaCl containing 9.20% of Ca(ClO)$_2$ and 79.40% of NaCl and 6 tonnes of mother liquor from the neutral substance which is recycled to the chlorinator B are obtained.

The suspension of sodium chloride is then washed and clarified using 25 tonnes of mother liquor from the dibasic substance coming from A$_3$. The calcium hypochlorite present in the sodium chloride is rendered soluble by the mother liquor to give rise to 26.7 tonnes of mother liquor from the clarification process, containing 5.61% of Ca(ClO)$_2$ and 23.25% of NaCl, this mother liquor being recycled to A$_2$. After suction-drying in E$_3$, 4.8 tonnes of NaCl containing 1% of Ca(ClO)$_2$, 93.80% of NaCl and 3.43% of H$_2$O are recovered.

The suction dried neutral calcium hypochlorite is subjected to the usual granulation, drying and stabilisation operations. 10 tonnes of calcium hypochlorite containing 73.18% of Ca(ClO)$_2$ and 18.35% of NaCl are obtained.

EXAMPLE 4

The aim of the present example is to show that the process of separating the crystals of calcium hypochlorite from the sodium chloride, by decanting, can be carried out with a single decanter and does not require the prior suction-drying of the suspension which is rich in NaCl before it is treated with the mother liquor from the dibasic substance which is depleted in hypochlorite. For this, reference is made to the diagram of FIG. 4.

4.5 tonnes of lime containing 97.10% of Ca(OH)$_2$ are mixed, so as to form a suspension, with 12.5 tonnes of mother liquor from the dibasic substance containing 3.75% of Ca(ClO)$_2$ and 22.11% of NaCl.17 tonnes of milk of lime containing 25.47% of Ca(OH)$_2$ (A$_1$) are obtained. 52.9 tonnes of mother liquor from the clarification process coming from E and containing 5.61% of Ca(ClO)$_2$ and 23.25% of NaCl, as well as 36.5 tonnes of mother liquor from the neutral substance coming from F and containing 9.70% of Ca(ClO)$_2$ and 19.86% of NaCl will react with the milk of lime in A$_2$. 106.4 tonnes of a suspension of dibasic hypochlorite containing 6.56% of Ca(ClO)$_2$ and 20.98% of NaCl form.

The suspension formed is concentrated in A$_3$ by decanting 49.5 tonnes of thickened suspension of dibasic substance containing 9.80% of Ca(ClO)$_2$, 8.80% of Ca(OH)$_2$ and 19.67% of NaCl, on the one hand, and 56.9 tonnes of mother liquor from the dibasic substance, this mother liquor being recycled to A$_1$ (12.5 tonnes) and to E$_2$(44.4 tonnes) on the other are isolated.

The suspension of dibasic substance coming from A$_3$, 7.3 tonnes of caustic soda containing 59.5% of NaOH, 7.7 tonnes of chlorine and 28.5 tonnes of mother liquor from the neutral substance coming from F are added to the chlorinator B to form, on a bed of preformed crystals of calcium hypochlorite and sodium chloride, 93 tonnes of a suspension containing 16.47% of Ca(ClO)$_2$, 23.35% of NaCl and 58.62% of H$_2$O.

The suspension coming from B feeds the decanter D$_1$ of the same type as that of Example 3. The overflow from D$_1$, corresponding to 79.7 tonnes containing 17.52% of Ca(ClO)$_2$ and 18.46% of NaCl, is suction-dried in F.

14.7 tonnes of suction-dried neutral hypochlorite containing 52.10% of $Ca(ClO)_2$ and 12.28% of NaCl, and 65 tonnes of mother liquor from the neutral substance, this mother liquor being recycled to B(28.5 tonnes) and to $A_2$(36.5 tonnes), are obtained. The underflow from $D_1$, corresponding to 13.3 tonnes containing 10.15% of $Ca(ClO)_2$ and 52.68% of NaCl, is taken up, with vigorous stirring in $E_2$ in 44.4 tonnes of mother liquor from the dibasic substance coming from $A_3$. The calcium hypochlorite held by the sodium chloride dissolves in the mother liquor from the dibasic substance. 4.8 tonnes of NaCl containing 1.02% of $Ca(ClO)_2$ are recovered and suction-dried in $E_3$. 52.9 tonnes of mother liquor from the clarification process coming from $E_3$ are recycled to $A_2$.

The suction-dried neutral calcium hypochlorite is granulated, dried and stabilised by the usual methods.

We claim:

1. Process for the manufacture of neutral calcium hypochlorite with high active chlorine content comprising the following steps:
   a. a milk of lime is prepared by adding calcium hydroxide to a part of the recycled mother liquor originating from step (c);
   b. the milk of lime is reacted with recycled mother liquor originating from step (g) or steps (g) and (h) or steps (f) and (h) to form a suspension of dibasic calcium hypochlorite;
   c. the suspension of dibasic calcium hypochlorite is separated from a part of its mother liquor to form a thickened slurry of dibasic calcium hypochlorite and a mother liquor, part of which is recycled to step (a) and another part of which is recycled to step (h);
   d. the thickened slurry of dibasic calcium hypochlorite and separately introduced sodium hydroxide are chlorinated together with gaseous chlorine in the presence of a suspension of preformed crystals of neutral calcium hypochlorite and crystals of sodium chloride and capable of acting as a seed bed for the production in the slurry of further separable and recoverable amounts of the desired neutral calcium hypochlorite product, this suspension receiving recycled mother liquor originating from step (f) or step (g) or steps (f) and (g) or steps (g) and (h) whereby crystals of neutral calcium hypochlorite and crystals of sodium chloride are in suspension in a mother liquor;
   e. the suspension of crystals produced in step (d) is formed into an upper suspension which is rich in crystals of neutral calcium hypochlorite and a lower suspension which is rich in crystals of sodium chloride and the lower and upper suspension separated from one another;
   f. the crystals of neutral calcium hypochlorite are separated from the suspension rich in calcium hypochlorite to leave a mother liquor which is recycled to step (e) or steps (b), (d) and (e) or steps (b) and (d);
   g. optionally the crystals of sodium chloride are separated from the suspension rich in sodium chloride, in which case the resulting mother liquor is recycled to step (d) or steps (b) and (d); and
   h. the sodium chloride crystals from step (g) when used, or the lower suspension issuing from step (e) when step (g) is not used, is treated with at least a part of the mother liquor arising from step (c) and the crystals of sodium chloride separated from their mother liquor which is recycled entirely to step (b) or entirely to step (d), all the steps being carried out at a temperature not exceeding 20° C.

2. A process according to claim 1 wherein no further reactants are used to prepare the dibasic calcium hypochlorite other than those specified in step (b).

3. A process according to claim 1 wherein the dibasic calcium hypochlorite is formed in step (b) in the presence of pre-formed crystals of dibasic calcium hypochlorite originating from a previous step (b) operation.

4. A process according to claim 1 or 2 or 3 wherein the separation in step (e) is carried out by flotation and the suspension produced in step (d) and optionally an agent to assist in flotation, compatible with calcium hypochlorite and free chlorine, is introduced into at least one flotation cell and a gas is introduced into the lower part of the cell creating a foam in the upper portion of the cell which entrains a significant part of the crystals of neutral calcium hypochlorite and then separating the foam from the contents of the lower portion of the cell containing crystals of sodium chloride.

5. A process according to claim 1 wherein the separation in step (e) is carried out by decantation.

6. A process according to claim 5 wherein a main decanter and a secondary decanter are used, a suspension containing predominantly neutral calcium hypochlorite is taken from the upper portion of the main decanter and separated from its mother liquor to give crystals of neutral calcium hypochlorite and a mother liquor, part of this mother liquor is recycled to the chlorinator and the other part of this mother liquor is then mixed with the lower portion of the main decanter and this mixture passed to the secondary decanter and a suspension containing predominantly crystals of neutral calcium hypochlorite is taken from the upper portion of the secondary decanter and a suspension containing predominantly crystals of sodium chloride is taken from the lower portion of the secondary decanter.

7. A process according to claim 5 wherein only one decanter is used, a suspension containing predominantly crystals of neutral calcium hypochlorite is removed from the upper portion of the decanter and separated from its mother liquor to give crystals of neutral calcium hypochlorite and a mother liquor and a suspension contaning predominantly crystals of sodium chloride is removed from the lower portion of the decanter and separated from its mother liquor to give crystals of sodium chloride and a mother liquor.

* * * * *